United States Patent
Lee et al.

(10) Patent No.: US 7,508,911 B1
(45) Date of Patent: Mar. 24, 2009

(54) X-RAY IMAGING SYSTEM AND METHODS OF USING AND FORMING AN ARRAY OF OPTIC DEVICES THEREIN

(75) Inventors: Susanne Madeline Lee, Cohoes, NY (US); Forrest Frank Hopkins, Cohoes, NY (US); Peter Michael Edic, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/857,857

(22) Filed: Sep. 19, 2007

(51) Int. Cl.
*G21K 1/06* (2006.01)
(52) U.S. Cl. ............................................. 378/84; 378/85
(58) Field of Classification Search .................. 378/84, 378/85

See application file for complete search history.

(56) References Cited

U.S. PATENT DOCUMENTS

| | | | |
|---|---|---|---|
| 5,192,869 A | 3/1993 | Kumakhov | 378/84 |
| 6,934,359 B2 | 8/2005 | Chen et al. | 250/505.1 |
| 7,366,374 B1 * | 4/2008 | Lee et al. | 385/31 |
| 2004/0047446 A1 * | 3/2004 | Platonov | 378/42 |

OTHER PUBLICATIONS

Tournear et al., "Gamma-Ray Channeling in Layered Structures", IEEE, pp. 4282-4285, 2004.

* cited by examiner

*Primary Examiner*—Courtney Thomas
(74) *Attorney, Agent, or Firm*—Jason K. Klindtworth

(57) ABSTRACT

An X-ray imaging system is provided that includes a target for emitting X-rays and having at least one target focal spot, and an array of multilayer optic devices for transmitting X-rays through total internal reflection. The array of multilayer optics devices are in optical communication with the at least one target focal spot. Further, a method for imaging an object with an X-ray imaging machine is provided. Also, a method for forming a stack of multilayer optic devices is provided.

21 Claims, 10 Drawing Sheets

X-RAY IMAGING SYSTEM AND METHODS OF USING AND FORMING AN ARRAY OF OPTIC DEVICES THEREIN

BACKGROUND

The invention relates generally to imaging systems and methods, and more particularly to imaging systems and methods of imaging using an array of optic devices.

Numerous applications exist that require a focused beam of electromagnetic radiation. For example, energy dispersive X-ray diffraction (EDXRD) may be used to inspect airline baggage for the detection of explosive threats or other contraband. Such EDXRD may suffer a high false positive rate due to weak diffracted X-ray signals. The weakness of the X-ray signals may stem from a variety of origins. First, a portion of the polychromatic X-ray spectrum used in EDXRD is produced by the Bremsstrahlung part of the source spectrum, which is inherently low in intensity. Second, X-ray source collimation may eliminate more than 99.99 percent of the source X-rays incident on the baggage volume under analysis. Third, some of the materials being searched for, e.g., explosives, may not diffract strongly as they are amorphous. Fourth, the diffracting volume may be small. The last two limitations arise from the type of threat materials being searched for in baggage, making all but the second limitation unavoidable. Although discussed in the context of explosives detection, the limitations described above are equally applicable to medical situations.

At lower X-ray energies, such as 60 keV and below, increasing the polychromatic X-ray flux density at the material being inspected has been addressed, for example, by coupling hollow glass polycapillary optics to low powered, sealed tube (stationary anode) X-ray sources. An example of hollow glass polycapillary optics may be found in, for example, U.S. Pat. No. 5,192,869. The glass is the low index of refraction material, and air filling the hollow portions is the high index of refraction material. These types of optics typically do not provide much gain at energy levels above 60 keV, since the difference in the indices of refraction between air and glass, and hence the critical angle for total internal reflection, becomes increasingly small as energy levels approach and surpass 60 keV.

Further, such optics use a concept of total internal reflection to reflect X-rays entering the hollow glass capillaries at appropriate angles back into the hollow capillaries, thereby channeling a solid angle of the source X-rays into collimated or focused beams at the output of the optic. As used herein, the term "collimate" refers to the creation of quasi-parallel beams of electromagnetic (EM) radiation from divergent EM beams. Only about five percent of an EM source's solid angle typically is captured by the input of such known optics.

In addition, the use of air in known optics as one of the materials prevents such optics from being placed within a vacuum. Thus, known optics are limited in their potential uses.

It would thus be desirable for a device that could collect more of the primary electromagnetic radiation from the source and redirect those rays to a desired spot to improve the electromagnetic radiation flux density at that spot.

BRIEF DESCRIPTION

The invention includes embodiments that relate to an X-ray imaging system that includes a target for emitting X-rays upon being struck by electrons from a source of electrons. The target has at least one target focal spot. The system also includes one or more multilayer optic devices for transmitting X-rays through total internal reflection. At least one of the one or more multilayer optics devices are in optical communication with the at least one target focal spot.

The invention includes embodiments that relate to a method for imaging an object with an X-ray imaging machine. The method includes emitting electron beams from at least one electron beam emitter toward a target having at least one target focal spot, emitting X-rays from the at least one target focal spot toward the object in response to being struck by the electron beams, and transmitting through total internal reflection the emitted X-rays via one or more multilayer optic devices positioned such that at least one of the one or more multilayer optic devices is in optical communication with the at least one target focal spot.

The invention includes embodiments that relate to a method for forming a stack of multilayer optic devices. The method includes forming a first solid phase layer, characterized by a first index of refraction, onto a planar blank and forming on the first solid phase layer a second solid phase layer, characterized by a second index of refraction to form a multilayer optic device, and repeating this step multiple times. The method also includes stacking each multilayer optic device upon another multilayer optic device.

These and other advantages and features will be more readily understood from the following detailed description of preferred embodiments of the invention that is provided in connection with the accompanying drawings.

DETAILED DESCRIPTION

Figure 1:
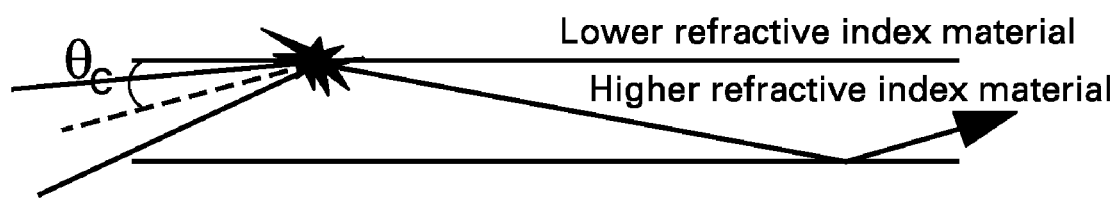
FIG. 1 is a schematic view illustrating the phenomenon of total internal reflection.
Figure 2:
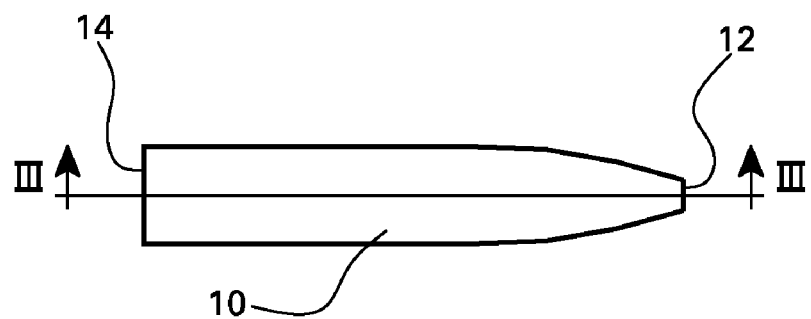
FIG. 2 is a top schematic view of an optic device constructed in accordance with an embodiment of the invention.
Figure 3:
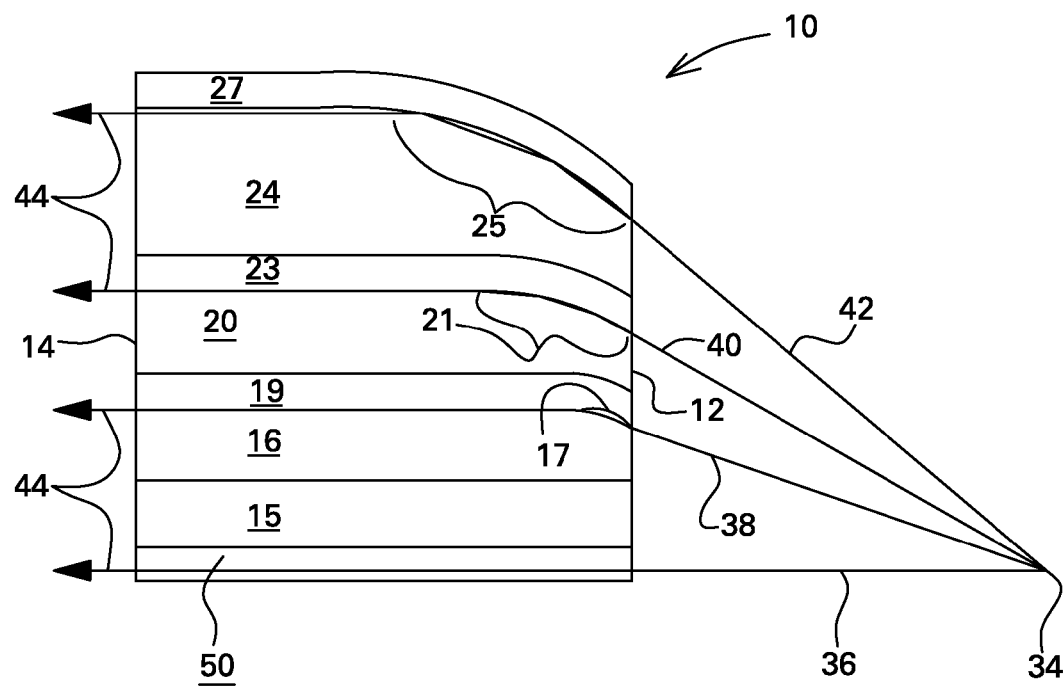
FIG. 3 is a cross-sectional view of the optic device of FIG. 2 taken along line III-III.
Figure 4:
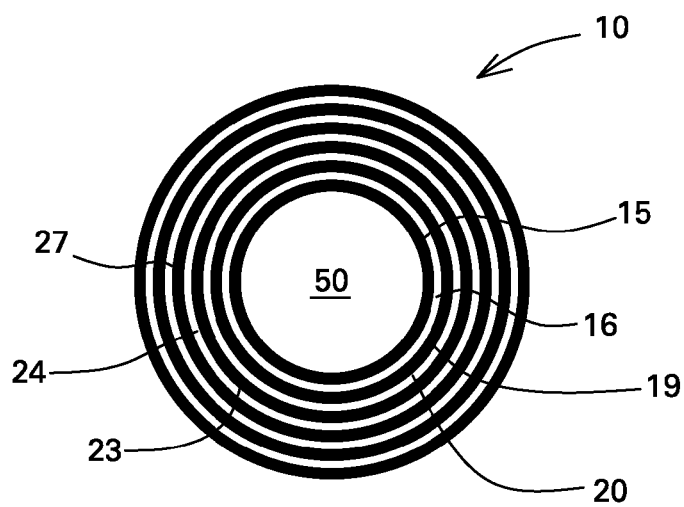
FIG. 4 is an end view of the optic device of FIG. 2.

Embodiments of the invention described herein utilize the phenomenon of total internal reflection. Referring to FIG. 1, when an angle of incidence is less than a critical angle $\theta_c$, total internal reflection occurs. The critical angle $\theta_c$ for total internal reflection depends on, among other factors, the selection of materials, the difference in the relative indices of refraction between the materials, the material photon absorption properties, and the energy of the incident photons. By appropriate material selection in the multilayer optic described herein, the critical angle $\theta_c$ can be increased several times over an air-glass critical angle, allowing many more photons to satisfy the condition for total internal reflection. This will allow a greater photon transmission through multilayer optic than is possible with, for example, polycapillary optics.

Referring now to FIGS. 2-5, there is shown a multilayer optic 10 including an input face 12 and an output face 14. By "multilayer" is meant a structure that has a plurality of layers with each layer having a single composition. As shown more particularly in FIGS. 3 and 4, the multilayer optic 10 includes multiple layers of material, each having a different index of refraction. For example, there are layers 16, 20, and 24 surrounding a core 50. Layer 15, formed of a lower index of refraction material, is positioned radially exterior to and contiguous with the core 50. The core 50 may be formed of a higher index of refraction material such as beryllium, lithium hydride, magnesium, or any other suitable elements or compounds having similarly higher refractive indices and high X-ray transmission properties. The core 50 may be less than a micrometer to greater than one centimeter in diameter. Layer 20 is positioned radially exterior to layer 16 and radially interior to layer 24.

In one embodiment, the layers making up the multilayer optic 10 may be formed of materials that have varying indices of refraction. For example, layers 15, 19, 23, and 27 may be formed of materials that have a lower index of refraction and a high X-ray absorption. For example, for high energy X-rays, appropriate materials may be chosen from osmium, platinum, gold, or any other suitable elements or compounds having similarly lower refractive indices and high X-ray absorption properties. Further, the core 50 and layers 16, 20, and 24 may be formed of materials having a higher index of refraction and a high X-ray transmission. For example, for high energy X-rays, appropriate materials may be chosen from beryllium, lithium hydride, magnesium, or any other suitable elements or compounds having similarly higher refractive indices and high X-ray transmission properties. The diameter of the core 50 is selected by considering the critical angle for total internal reflection between the higher index of refraction of the core 50 and the lower index of refraction of the layer 15 and the distance between the optic input face and a focal point of a source By using alternating lower and higher index of refraction materials with concurrent high and low X-ray absorption properties, respectively, in contiguous layers, the multilayer optic 10 can utilize the principle of total internal reflection of electromagnetic radiation. Specifically, diverging electromagnetic radiation beams 38, 40, and 42 stemming from an electromagnetic radiation source 34 enter the input face 12 and are redirected by the principle of total internal reflection into quasi-parallel beams of photons 44 exiting the output face 14.

Multilayer optics in accordance with embodiments of the invention, such as optic 10, can collect a large solid angle of X-rays emitted from an X-ray source 34 and redirect photons containing polychromatic energies into quasi-parallel photon beams. "Quasi-parallel" means that diverging beams of photons, such as X-rays, have been collected and focused into beams of electromagnetic radiation or X rays to exit the output face 14 at or below the critical angle $\theta_c$. This divergence causes the intrinsic source X-ray beam to be larger than the output face 14 of the optic 10 and larger than the quasi-parallel beam of X rays produced by the optic. Alternatively, multilayer optics in accordance with embodiments of the invention may be configured to produce slightly focused, highly focused, slightly diverging, or highly diverging beams. By "slightly focused" is meant that the beam size at the point of interest (i.e., where the diameter of the beam is of concern) is approximately the same as at the output face 14 of the optic 10. By "highly focused" is meant that the beam size at the point of interest is smaller than at the output face 14 of the optic 10. By "slightly diverging" is meant that the beam size is larger than a quasi-parallel beam but smaller than the intrinsic source beam. By "highly diverging" is meant that the beam is the same size or larger than the intrinsic source beam. The phrase "intrinsic source beam" is meant to represent an X-ray beam emitted from the source housing with no optic in the beam.

The composition of materials making up the multilayer optic 10, the macroscopic geometry of the multilayer optic 10, the thickness of the multilayer optic 10, and the number of individual layers determine the angular acceptance range of the multilayer optic 10. The angular acceptance range may be from about 0 steradians up to about $2\pi$ steradians of a solid angle of a photon source. For ease of illustration, only a few layers have been illustrated with reference to multilayer optic 10. However, it should be appreciated that any number of layers, including into the hundreds, thousands, or millions of layers, can be fabricated to utilize total internal reflection to form the various types of photon beams listed previously.

Another feature of the multilayer optic 10 is that the core 50 and the layers 16, 20, 24 have photon, or X-ray, redirection regions. For example, layer 16 has a photon redirection region 17 stemming from a center of curvature; layer 20 has a photon redirection region 21 stemming from a second center of curvature; and, layer 24 has a photon redirection region 25 stemming from yet another center of curvature. The photon redirection regions 17, 21, 25 are chosen to allow for the diverging electromagnetic radiation beams 38, 40, and 42 to be made parallel or near parallel to beam 36, or conversely to allow for parallel or converging electromagnetic radiation beams to be made diverging. The minimum photon redirection region is determined by the minimum thickness that would still enable a smooth surface, which is at least two atomic layers, or about ten angstroms. The photon redirection regions 17, 21, 25 each contain redirecting segments. The redirecting segments are chosen such that they each have a constant curvature. The curvature of each redirecting segment may be the same as or different from the curvatures of other redirecting segments. If each of the redirecting segments for a particular photon redirection region is straight, then the radius of curvature is infinite.

By curving the multilayers 16, 20, 24 at the input side of the optic 10, the photons or electromagnetic radiation 38, 40, 42 entering the input face 12 can be redirected into parallel pencil beams 44, thereby increasing the photon flux density at the output face 14 over the photon flux density in the direct source beam at the same distance from the source 34. Depending upon the number of layers in the multilayer optic, there may be a photon density gain for 100 keV photons of as much as 5000 times in the output intensity of electromagnetic radiation from the multilayer optic over the output of conventional pinhole collimators. It should be appreciated that, alternatively, the output face 14 may be formed closer to the input face 12, i.e., positioned prior to the region where the photons are redirected into parallel rays, allowing the input electromagnetic radiation beams 38, 40, 42 to remain somewhat diverging as they exit the output face 14. It should further be appreciated that core 50 and any number of the layers may have no arc of curvature, instead having a cylindrical cross-sectional profile.

An important feature of this optic 10 is that the layers can be made thin enough and the overall optic length (from input face 12 to output face 14) short enough that photons are redirected through bounces along only one side of a particular layer, for example, layer 24. This is unlike known optics, where the photons bounce off both sides of a particular layer. The fewer number of bounces needed to redirect the photons in this multilayer optic 10 significantly increase the photon transmission efficiency of the optic 10.

Another feature of the multilayer optic 10 is that through fabrication techniques that will be described in detail below, the individual layers can be formed conformally on one another. The conformation of the layers enables the multilayer optic 10 to be utilized in a vacuum environment. Prior art optics utilize air as the higher refractive index material. Such optics cannot be used in vacuum environments. Further, the multilayer optic 10 can be utilized in applications that operate at energy levels above 60 keV, such as, for example, X-ray diffraction, CT medical and industrial imaging, medical and industrial X-ray, and cargo inspection, to name a few. Some of these applications may operate at energy levels as high as the MeV range.

Figure 6:
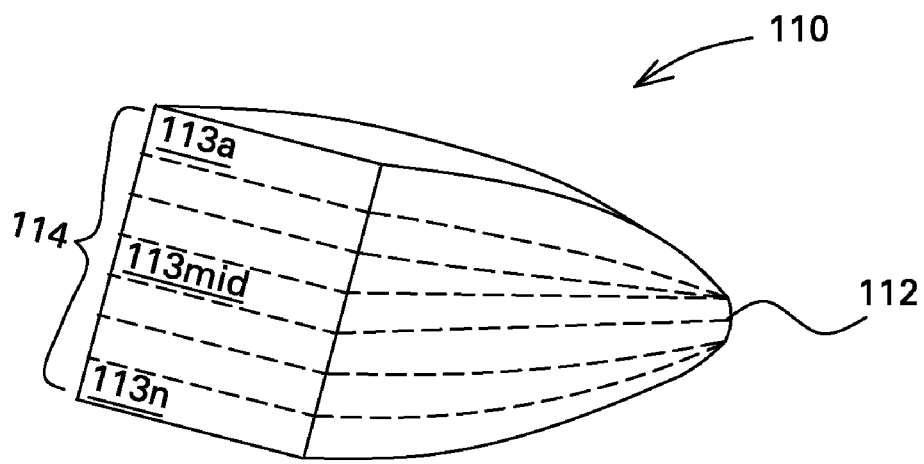
FIG. 6 is a perspective view of an optic device constructed in accordance with an embodiment of the invention.

Referring now to FIG. 6, there is shown a multilayer optic 110 including a plurality of layers 113a-113n, one on top of the other, extending between an input face 112 and an output face 114 having a polygonal profile. As illustrated, the middle layer of the multilayer optic 110 is layer 113mid. Except for layer 113mid, all of the layers include a photon redirection region positioned between the input face 112 and the output face 114. It should be appreciated, however, that layer 113mid may include a photon redirection region, or that other layers in addition to 113mid may lack a photon redirection region. The design shown allows diverging electromagnetic radiation to be input into the input face 112, redirected by the optic multilayers, and output from the output face 114 into a reduced cone beam, such as, for example, a reduced cone fan beam. A reduced-cone fan beam refers to reducing the angle at which X-rays are oriented with respect to an object being scanned in the longitudinal direction, i.e. the cone angle, while maintaining the fan angle of the X-ray beam in the transverse orientation. Depending upon where the output face 114 is located relative to the photon redirection regions, the fan beams may be parallel or near parallel or may be somewhat divergent but still focused relative to the input of electromagnetic radiation. Additionally, the conformal nature of the individual layers allows for the multilayer optic 110 to be utilized in a vacuum environment.

Figure 7:
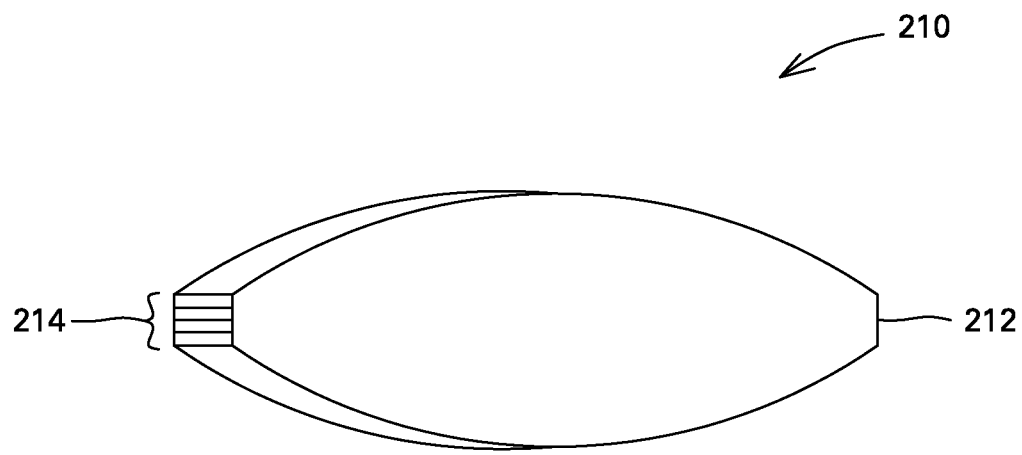
FIG. 7 is a perspective view of an optic device constructed in accordance with an embodiment of the invention.

Referring to FIG. 7, there is shown a multilayer optic 210 that includes an input face 212 and an output face 214. As with the embodiment shown in FIG. 6, the multilayer optic 210 includes individual layers sandwiching a mid-layer. The design shown allows for a focused fan beam output. As with the previously described embodiments, the conformal nature of the individual layers allows the multilayer optic 210 to be used in a vacuum environment.

Figure 8:
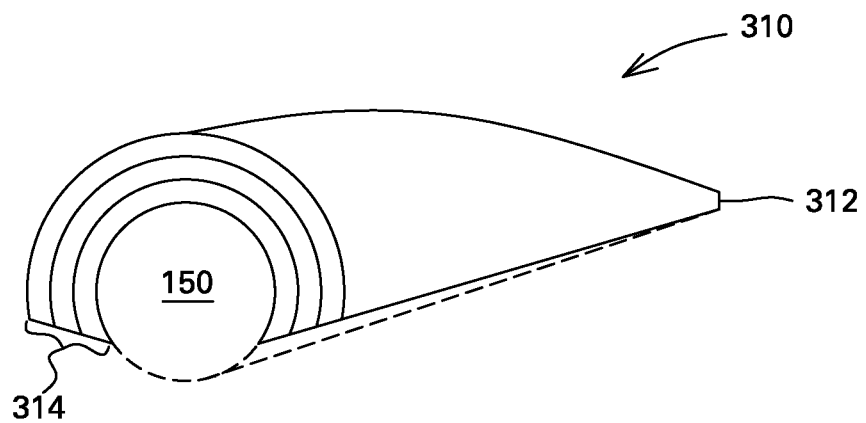
FIG. 8 is a perspective view of an optic device constructed in accordance with an embodiment of the invention.

FIG. 8 illustrates a multilayer optic 310 having an input face 312 and an output face 314. The layers have been positioned over a cone 150, which serves as a blank or mold for the individual layers. Through this design, the output beam exiting the output face 314 is shaped into a curved output, which can be coupled to a singly curved diffracting crystal (not shown) to enable the creation of a cone beam of highly monochromatic radiation. Monochromatic radiation is used in several different applications, including, for example, X-ray diffraction. Highly monochromatic radiation is radiation within a very narrow energy range approximately equal to that produced by diffracting from a single crystal. The singly curved diffracting crystal can be formed of any suitable material, such as, for example, mica, silicon, germanium, or platinum and curved so that the crystal conforms to the surface of, for example, a cone or cylinder. The suitability of any material for use as the diffracting crystal is dependent upon the diffraction intensity and the lattice spacing of the material. It should be appreciated that the multilayer optic 310 should be positioned between the source of the electromagnetic radiation and the diffracting crystal.

Figure 5:
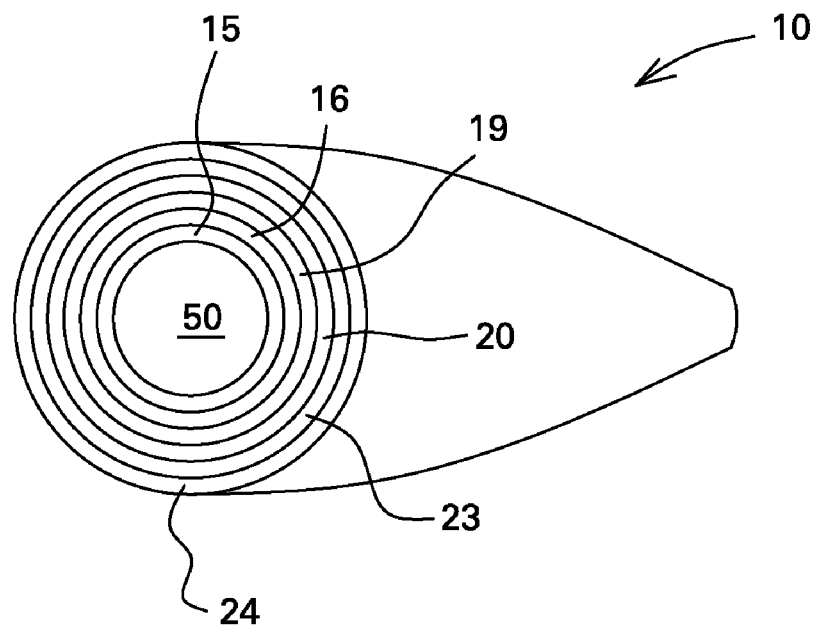
FIG. 5 is a perspective view of an optic device like the optic device of FIG. 2.

Placing a filter at the input or the output faces of the optics in FIGS. 5-7 will make the output radiation from these optics quasi-monochromatic. Quasi-monochromatic radiation is radiation within a limited wavelength range that is greater than the highly monochromatic range but less than the full Bremsstrahlung spectrum from an X-ray source.

Figure 9:
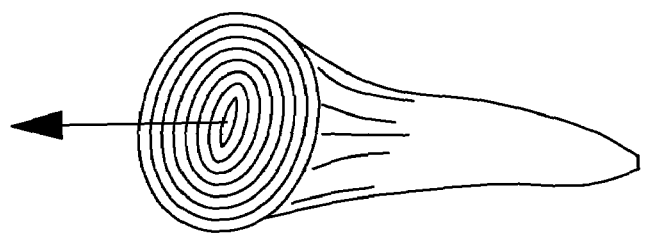
FIG. 9 is a perspective view of an optic device constructed in accordance with an embodiment of the invention.
Figure 10:
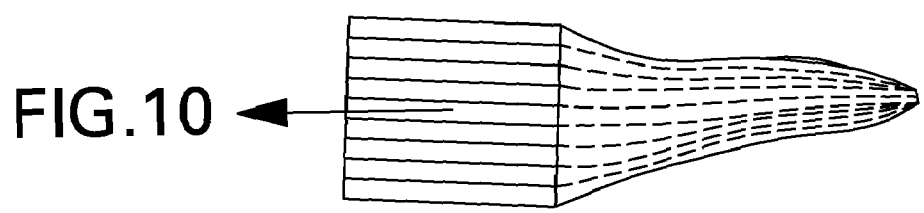
FIG. 10 is a perspective view of an optic device constructed in accordance with an embodiment of the invention.
Figure 11:
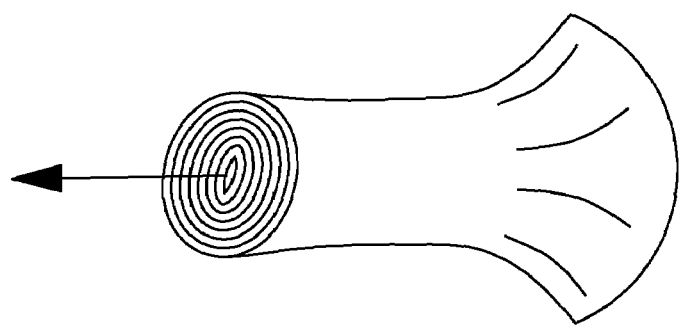
FIG. 11 is a perspective view of an optic device constructed in accordance with an embodiment of the invention.
Figure 12:
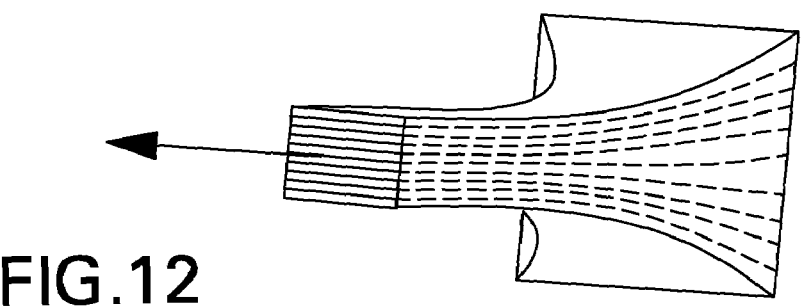
FIG. 12 is a perspective view of an optic device constructed in accordance with an embodiment of the invention.

FIGS. 9-12 illustrate various other potential embodiments of multilayer optics. FIGS. 9 and 10 illustrate multilayer optics that have output faces in a photon redirection region, thereby allowing such optics to emit highly diverging beams. FIGS. 11 and 12 illustrate multilayer optics whose output faces are dimensionally smaller than their respective input faces, allowing such optics to emit highly focused beams.

Figure 13:
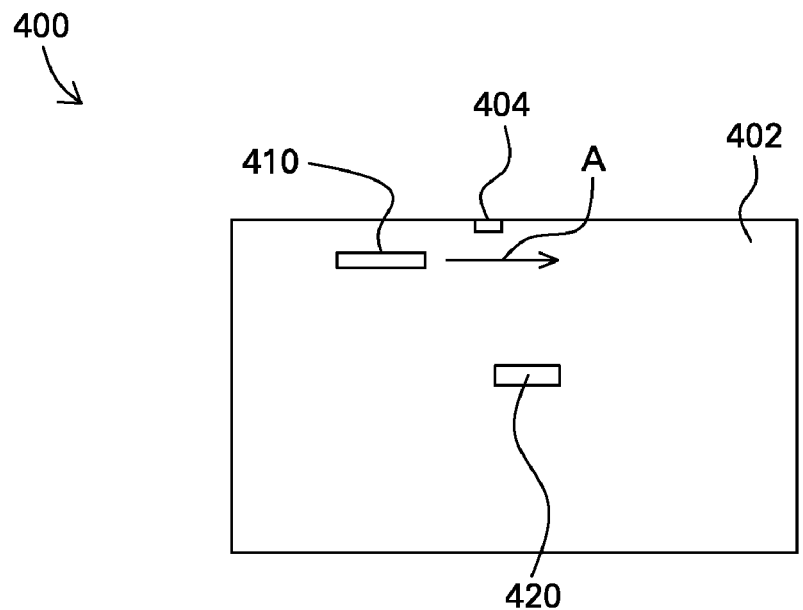
FIG. 13 is a schematic view of a deposition assembly constructed in accordance with an embodiment of the invention.

Referring now to FIG. 13, next will be described an apparatus for use in forming a multilayer optic. Specifically, a multilayer optic deposition assembly 400 is shown including a deposition chamber 402 and a movable shutter apparatus 410. The deposition chamber 402 may be utilized in suitable deposition techniques, including, for example, vapor deposition, or thermal spray deposition. Suitable vapor deposition techniques include sputtering, ion implantation, ion plating, laser deposition, evaporation, and jet vapor deposition. Evaporation techniques may include thermal, electron-beam, or any other suitable technique resulting in appreciable deposition of material. Suitable thermal spray deposition includes combustion, electric arc, and plasma spray. The deposition chamber 402 includes an inputting apparatus 404 for allowing ingress of deposition materials into the deposition chamber 402. It should be appreciated that the inputting apparatus 404 may include numerous inlet nozzles, each being associated with a specific deposition material. A blank 420 is positioned within the deposition chamber 402. The blank 420 may be a core 50 or a cone 150, described previously with regard to the embodiments illustrated in FIGS. 4 and 8, respectively, or it may be a substrate serving as a support mechanism for deposited layers. It should be appreciated that the blank 420 can assume virtually any suitable geometric configuration consistent with the desired beam profile. Examples of the almost infinite number of suitable geometric configurations include a circular wafer, a rectangular prism, a cone, a cylinder, and an egg-shape, to name a few.

The shutter apparatus 410 enables the formation of a multilayer optic wherein the individual layers have a photon redirection region. Specifically, as a deposition material is input into the deposition chamber 402 through the inputting apparatus 404, the shutter apparatus 410 moves in a direction A relative to the blank 420. If the speed of the shutter apparatus 410 decreases as it moves in the direction A, an increasing amount of deposition material will contact the blank 420 in the direction A, thereby enabling the formation of a multilayer optic with individual layers having different thicknesses and having photon redirection regions. Control of the movement and velocity of the shutter apparatus 410 may be accomplished electronically with a digital controlling mechanism, such as a microcontroller, microprocessor, or computer. Alternatively, control of the movement may be accomplished manually, or mechanically, such as, pneumatically, hydraulically, or otherwise.

By moving the shutter apparatus 410 along direction A as each deposition material is input through the inputting apparatus 404 into the deposition chamber 402, the individual layers can be deposited upon the blank 420, and a multilayer optic having conformal individual layers, like the multilayer optic 110 shown in FIG. 6, can be formed. In forming a multilayer optic like the multilayer optic 110, the first layer to be laid down may be the mid-layer 113*mid*. Then, the subsequent layers leading to and including layer 113*a* can be deposited. Then, the partially formed multilayer optic can be turned over and the layers leading to and including layer 113*n* can be deposited. Further, assuming a constant rate of deposition material being injected into the deposition chamber 402, if the shutter apparatus 410 is programmed to begin with a first velocity, transition into a second different velocity, and then transition back to the first velocity, a multilayer optic like the multilayer optic 210 shown in FIG. 7 can be formed. It should be appreciated that the deposition rate of the deposition material in the deposition chamber 402 may be altered as well.

Instead of utilizing a shuttle apparatus 410, it is possible to move at varying speeds the inputting apparatus 404 relative to the blank 420. Further, it is possible to move at varying speeds the blank 420 within the deposition chamber 402 relative to the inputting apparatus 404.

Figure 14:
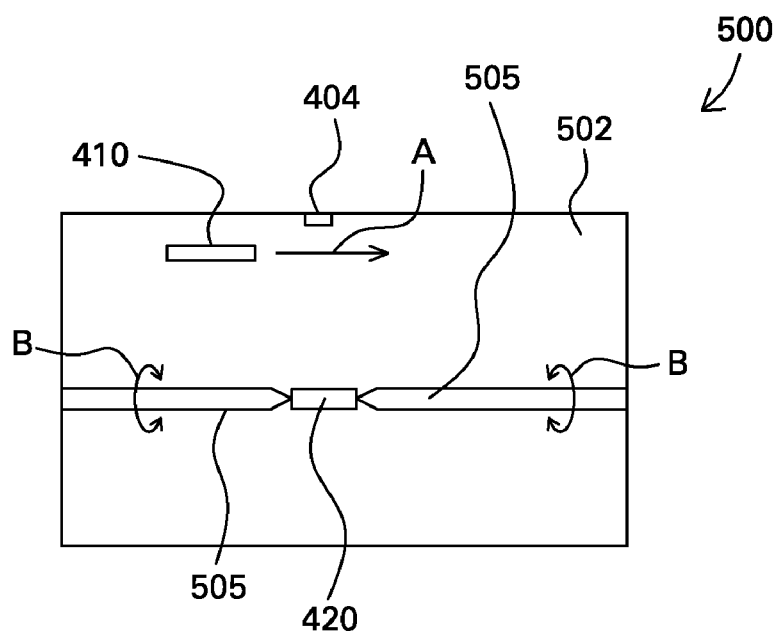
FIG. 14 is a schematic view of a deposition assembly constructed in accordance with an embodiment of the invention.

Referring to FIG. 14, there is shown a multilayer optic deposition assembly 500 that includes a deposition chamber 502 and the movable shutter 410. The deposition chamber 502 includes the apparatus 404 that is the source of a vapor stream and a pair of rotatable spindles 505. The spindles 505 are capable of rotating in a direction B. Further, the spindles 505 each include a pointed end that comes into contact with and holds the blank 420. By rotating the spindles 505 in the same direction B the blank 420 can be rotated while deposition material is introduced into the deposition chamber 502 through the inputting apparatus 404. Movement of the shutter apparatus 410 in the direction A and rotation of the blank 420 in the direction B will enable the formation of a multilayer optic such as the multilayer optic 10 shown in FIG. 5. Alternatively, the spindles 505 can remain in a non-rotating state during a first set of deposition steps to form the layers 113*mid* to 113*a* for the optic shown in FIG. 6. Then, the spindles 505 can be rotated to turn the partially formed multilayer optic one hundred and eighty degrees around to allow for a second set of deposition steps to form the layers leading to and including 113*n* to form the multilayer optic 110.

Instead of utilizing a shutter apparatus 410, it is possible to move at varying speeds the inputting apparatus 404 relative to the blank 420 while the blank 420 is being rotated by the spindles 505. Further, it is possible to move at varying speeds the spindles 505 and the blank 420 within the deposition chamber 402 relative to the inputting apparatus 404.

Figure 15:
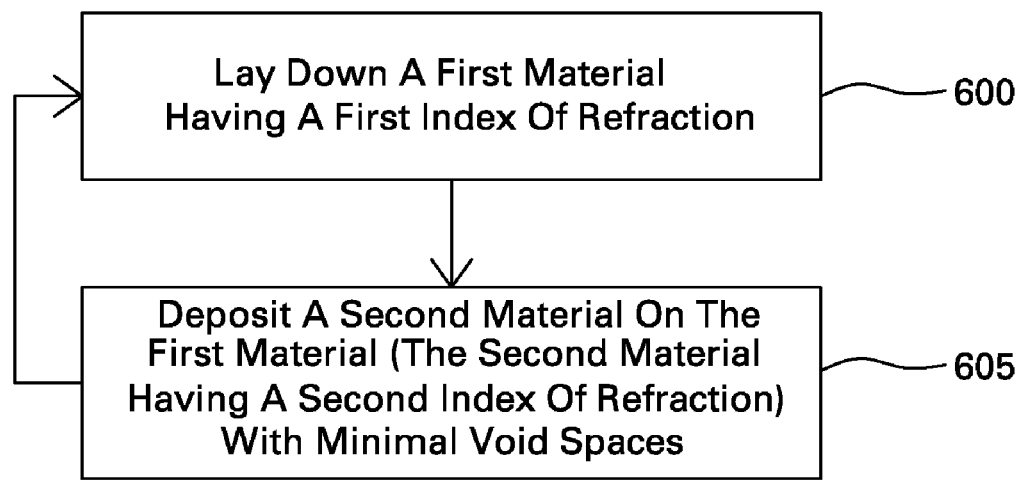
FIG. 15 illustrates process steps for fabricating an optic device in accordance with an embodiment of the invention.

FIG. 15 illustrates process steps for forming a multilayer optic in accordance with an embodiment of the invention. At Step 600, a first material having a pre-determined index of refraction with a pre-determined photon transmission coefficient is deposited. The first material is deposited on a blank or substrate, which may be a core, a cone, or a polygonal support mechanism. It should be appreciated that the blank or substrate may be incorporated within the multilayer optic, such as the core 50, or may serve merely as a mold, like cone 150. Then, at Step 605, a second material having a second index of refraction with a second photon transmission coefficient is deposited on the first material in such a way as to be conformal and have minimal void spaces. It should be appreciated that each individual layer may be formed at thicknesses in the range of one nanometer to thousands of nanometers. After Step 605, the Steps 600 and 605 can be sequentially repeated to prepare multiple pairs of layers, with each pair having one layer having a first index of refraction with a first photon transmission coefficient and a second layer having a second index of refraction with a second photon transmission coefficient. The deposition of the first and second materials may be accomplished by any number of suitable processes, such as, for example, vapor deposition, thermal spray deposition, or electroplating. As noted previously, examples of suitable vapor deposition techniques include sputtering, ion implantation, ion plating, laser deposition (using a laser beam to vaporize a material or materials to be deposited), evaporation, or jet vapor deposition (using sound waves to vaporize a material or materials to be deposited). Also as noted previously, evaporation techniques may be thermal, electron-beam or any other suitable technique that will result in appreciable deposition of material. Examples of suitable thermal spray deposition techniques include combustion, electric arc, and plasma spray.

It should be appreciated that during the deposition process, the partially formed multilayer optic may be rotated, oscillated, or moved, it may be turned, and it may be subjected to a deposition process whereby the deposition material is deposited at different rates along the axis of the multilayer optic. In this way, multilayer optics can be formed with various configurations and profiles that will allow for a greater amount of electromagnetic radiation to be collected from an X-ray source at the input of the optic, parallel or near parallel beams of electromagnetic radiation to be output from the multilayer optic, or the beams of electromagnetic radiation output from the multilayer optic may be shaped into pencil beams, cone beams, fan beams, or curved in an arc, as an example.

Multilayer optics in accordance with embodiments of the invention may be used in various industrial applications. For example, a multilayer optic formed to emit a quasi-parallel beam having a circular cross-section may find utility in X-ray diffraction and backscatter applications, such as non-destructive examination. A multilayer optic formed to emit a slightly focused beam with a circular cross-section may find utility in X-ray diffraction, X-ray fluorescence, computed tomography, medical diagnostic or interventional treatments, and non-destructive examination applications. Multilayer optics formed to emit a highly focused beam having a circular cross-section may find utility in X-ray fluorescence; medical diagnostic or interventional treatments of, for example, small tumors; and, non-destructive examination applications. Multilayer optics formed to emit a slightly diverging beam having a circular cross-section may find utility in computed tomography and X-ray diagnostic system applications. Multilayer optics formed to emit a highly diverging beam having a circular cross-section may find utility in non-destructive examination applications requiring an increased field-of-view, and in medical diagnostic or interventional imaging and treatments requiring an increased field-of-view, such as the imaging and treatment of large tumors.

One example of the utility of multilayer optics formed to emit a variety of beam shapes is in medical interventional treatments, such as treatment of tumors, where the optic shape is determined by the tumor shape. Such multilayer optics would allow X rays to be focused onto the tumor without irradiating nearby healthy tissue, providing targeted treatment with a minimum of damage to surrounding healthy tissue.

Multilayer optics formed to emit a fan beam in one plane that is quasi-parallel, slightly focusing, highly focusing, slightly diverging, or highly diverging in a direction transverse to the plane may find utility in computed tomography, X-ray diagnostic system, and non-destructive examination applications. The fan beam may have a divergence the same as, less than, or greater than that of the source. Alternatively, multilayer optics formed to emit a quasi-parallel fan beam in one plane that is quasi-parallel, slightly focused, highly focused, slightly diverging, or highly diverging within the plane of the fan would produce a beam having a rectangular cross-section that may find utility in non-destructive and medical examination applications.

Multilayer optics formed to emit a fan beam in one plane that is slightly or highly diverging in the direction transverse to the fan beam plane may find utility in medical interventional applications, such as close-up imaging to increase field-of-view. The divergence in the direction transverse to the fan beam plane is equal to or greater than the source divergence. Multilayer optics formed to emit a fan beam in one plane that is quasi-parallel, slightly focusing, highly focusing, slightly diverging, or highly diverging perpendicular to the plane of the fan may find utility in computed tomography, X-ray diagnostic system, and non-destructive examination applications. The fan beam may have a divergence the same as, less than, or greater than that of the source. Multilayer optics formed to emit a fan beam in one plane that is slightly or highly diverging in the direction transverse to the fan beam plane may find utility in medical interventional applications, such as close-up imaging to increase field-of-view. The divergence in the direction transverse to the fan beam plane is equal to or greater than the source divergence.

A multilayer optic coupled to a diffracting crystal may produce a quasi-parallel monochromatic fan beam that may find utility, provided the intensity is great enough, in medical imaging and interventional treatments. Such monochromatic imaging would reduce a patient's dose of X-rays while increasing the resolution and reducing artifacts, such as beam hardening, which result from the use of a polychromatic X-ray spectrum for imaging.

Figure 16:
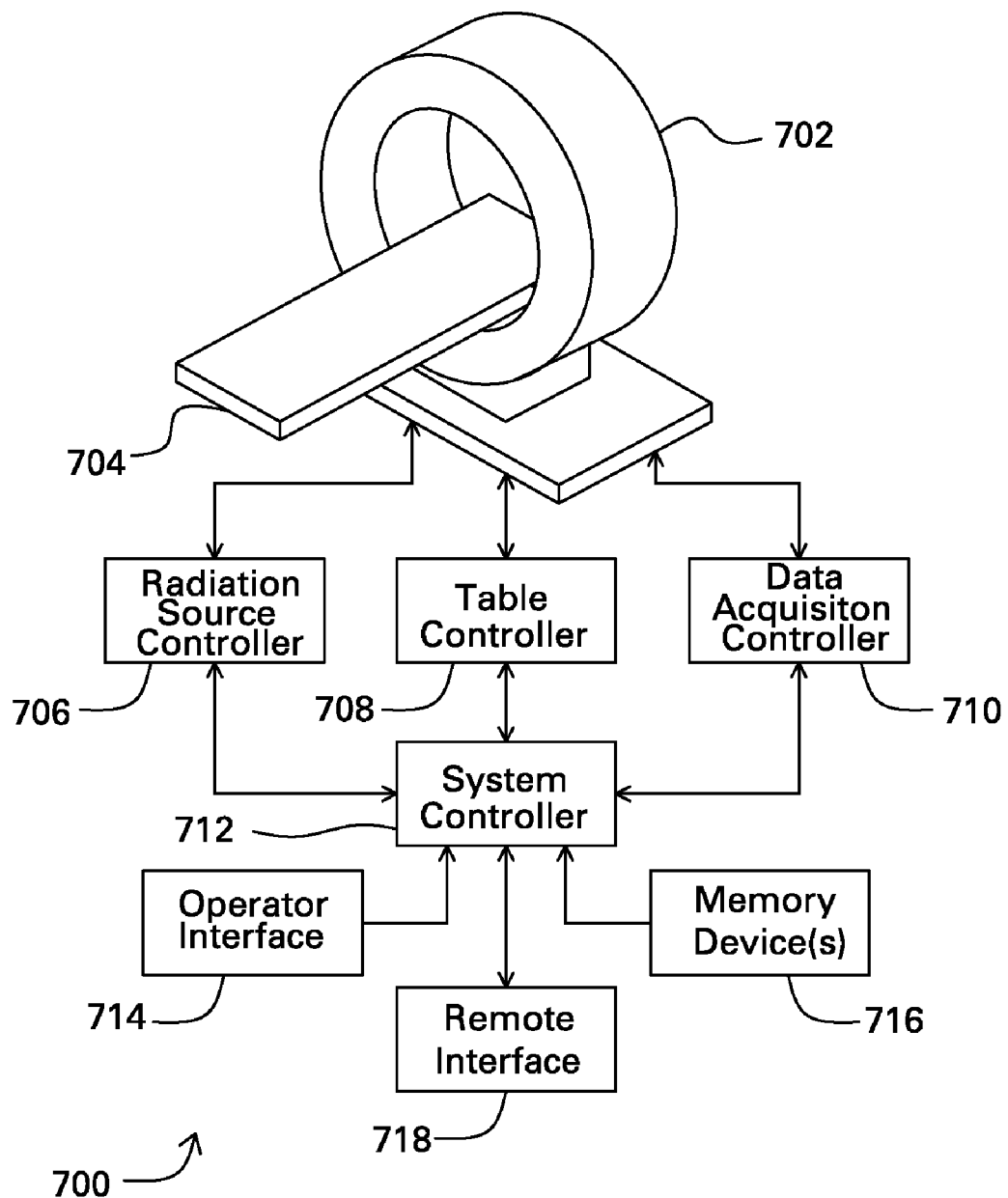
FIG. 16 is a diagrammatical representation of a conventional computed tomography imaging system.

FIG. 16 illustrates a conventional acquisition system 700 for use in an object detection system, such as, for example, a computed tomography (CT) scanner. The acquisition system 700 comprises a scanner 702 formed of a support structure and internally containing one or more stationary or rotational distributed sources of X-ray radiation (not shown in FIG. 16) and one or more stationary or rotational digital detectors (not shown in FIG. 16), as described in greater detail below. The scanner 702 is configured to receive a table 704 or other support for an object to be scanned, such as, for example, baggage or luggage or patients. The table 704 can be moved through an aperture in the scanner to appropriately position the subject in an imaging volume or plane scanned during imaging sequences.

The system further includes a radiation source controller 706, a table controller 708 and a data acquisition controller 710, which may all function under the direction of a system controller 712. The radiation source controller 706 regulates timing for discharges of X-ray radiation which is directed from points around the scanner 702 toward a detector element on an opposite side thereof, as discussed below. The radiation source controller 706 may trigger one or more emitters in a distributed X-ray source at each instant in time for creating multiple projections or frames of measured projection data. In certain arrangements, for example, the X-ray radiation source controller 706 may trigger emission of radiation in sequences to collect adjacent or non-adjacent frames of measured data around the scanner. Many such frames may be collected in an examination sequence, and data acquisition controller 710, coupled to detector elements as described below receives, signals from the detector elements and processes the signals for storage and later image reconstruction. In configurations described below in which one or more sources are rotational, source controller 706 may also direct rotation of a gantry on which the distributed source or sources are mounted. Table controller 708, then, serves to appropriately position the table and subject in a plane in which the radiation is emitted, or, in the present context, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 710 may also direct rotation of a gantry on which the detector or detectors are mounted.

System controller 712 generally regulates the operation of the radiation source controller 706, the table controller 708 and the data acquisition controller 710. The system controller 712 may thus cause radiation source controller 706 to trigger emission of X-ray radiation, as well as to coordinate such emissions during imaging sequences defined by the system controller. The system controller may also regulate movement of the table in coordination with such emission to collect measurement data corresponding to volumes of particular interest, or in various modes of imaging, such as helical modes. Moreover, system controller 712 coordinates rotation of a gantry on which the source(s), detector(s), or both are mounted. The system controller 712 also receives data acquired by data acquisition controller 710 and coordinates storage and processing of the data.

It should be borne in mind that the controllers, and indeed various circuitry described herein, may be defined by hardware circuitry, firmware or software. The particular protocols for imaging sequences, for example, will generally be defined by code executed by the system controllers. Moreover, initial processing, conditioning, filtering, and other operations required on the measurement data acquired by the scanner may be performed in one or more of the components depicted in FIG. 16. For example, as described below, detector elements will produce analog signals representative of depletion of a charge in photodiodes positioned at locations corresponding to pixels of the data acquisition detector. Such analog signals are converted to digital signals by electronics within the scanner, and are transmitted to data acquisition controller 710. Partial processing may occur at this point, and the signals are ultimately transmitted to the system controller for further filtering and processing. Additionally, the controllers may be implemented as separate entities, as shown in FIG. 16, or they may be included as a single piece of hardware, firmware or software.

System controller 712 is also coupled to an operator interface 714 and to one or more memory devices 716. The operator interface may be integral with the system controller, and will generally include an operator workstation for initiating imaging sequences, controlling such sequences, and manipulating measurement data acquired during imaging sequences. The memory devices 716 may be local to the imaging system, or may be partially or completely remote from the system. Thus, imaging devices 716 may include local, magnetic or optical memory, or local or remote repositories for measured data for reconstruction. Moreover, the memory devices may be configured to receive raw, partially processed or fully processed measurement data for reconstruction.

System controller 712 or operator interface 714, or any remote systems and workstations, may include software for image processing and reconstruction. As will be appreciated by those skilled in the art, such processing of CT measurement data may be performed by a number of mathematical algorithms and techniques. For example, conventional filtered back-projection techniques may be used to process and reconstruct the data acquired by the imaging system. Other techniques, and techniques used in conjunction with filtered back-projection may also be employed. A remote interface 718 may be included in the system for transmitting data from the imaging system to such remote processing stations, viewing stations, or memory devices.

Figure 17:
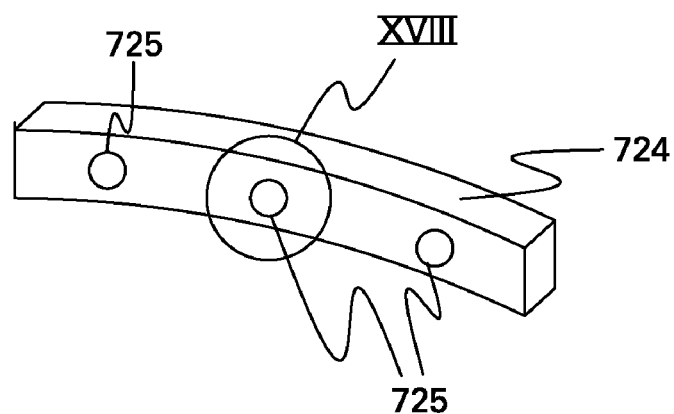
FIG. 17 is a schematic view of a target focal spot on a target in accordance with an embodiment of the invention.
Figure 18:
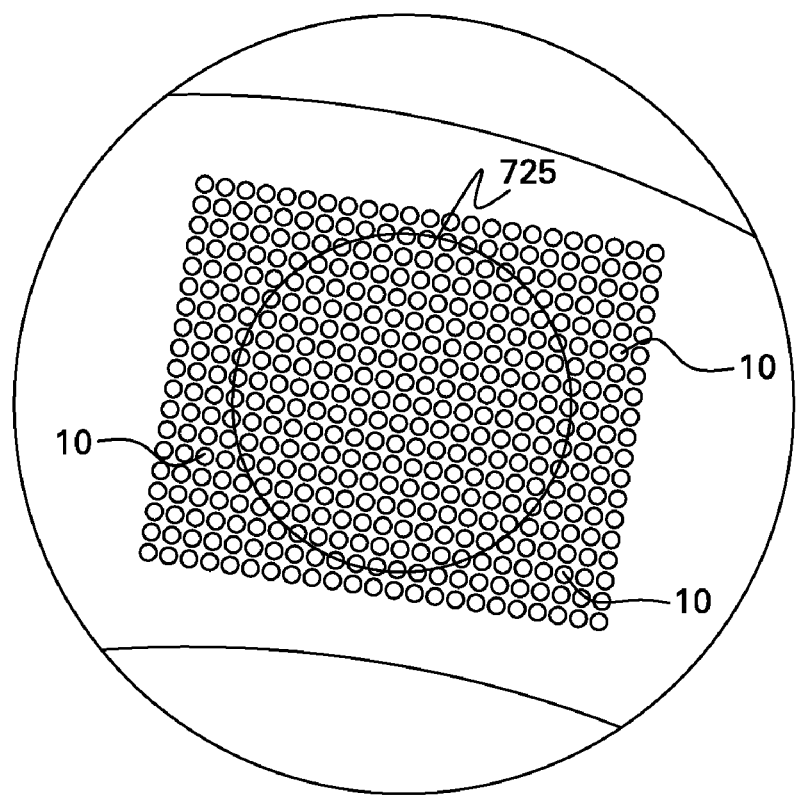
FIG. 18 is a close up schematic view within circle XVIII of FIG. 17 illustrating an array of multilayer optics positioned in optical communication with the target focal spot of FIG. 17 in accordance with an embodiment of the invention.

With specific reference to FIGS. 17 and 18, there is shown another embodiment of the invention including a target 724, such as a rotatable or stationary target used in a computed tomography system. The target 724 includes a single target focal spot or a plurality of target focal spots 725. Further, the target 724 is enclosed within a vacuum housing (not shown) that includes at least one X-ray transmissive window. The target 724 can be rotated such that a target focal spot 725 is positioned in optical communication with one of the windows. The target focal spots 725 on the target 724 are generated from electrons that are accelerated toward the target; the electrons are emitted from one or more electron emitters.

FIG. 18 illustrates an array of multilayer optics 10 (FIG. 4) positioned such that at least one of the multilayer optics is in optical communication with a target focal spot 725. The multilayer optics 10 may be mounted on one of the windows of the vacuum housing, either within the housing or on the exterior surface of the window outside of the housing. Alternatively, the multilayer optics 10 may be mounted on or near the target 724 (for transmission targets) or near the target 724 (for reflection targets) in locations where the target spots 725 are found.

It is known that target focal spots, such as the target focal spot 725, are not completely static and instead can move to some degree. It is understood that the array of multilayer optics 10 should be of sufficient size to compensate for the likely movement of the target focal spot 725. Further, although the array of multilayer optics 10 is shown to optically cover the entire target focal spot 725, it should be appreciated that the array may cover less than the entire target focal spot 725 and still function efficiently.

Figure 19:
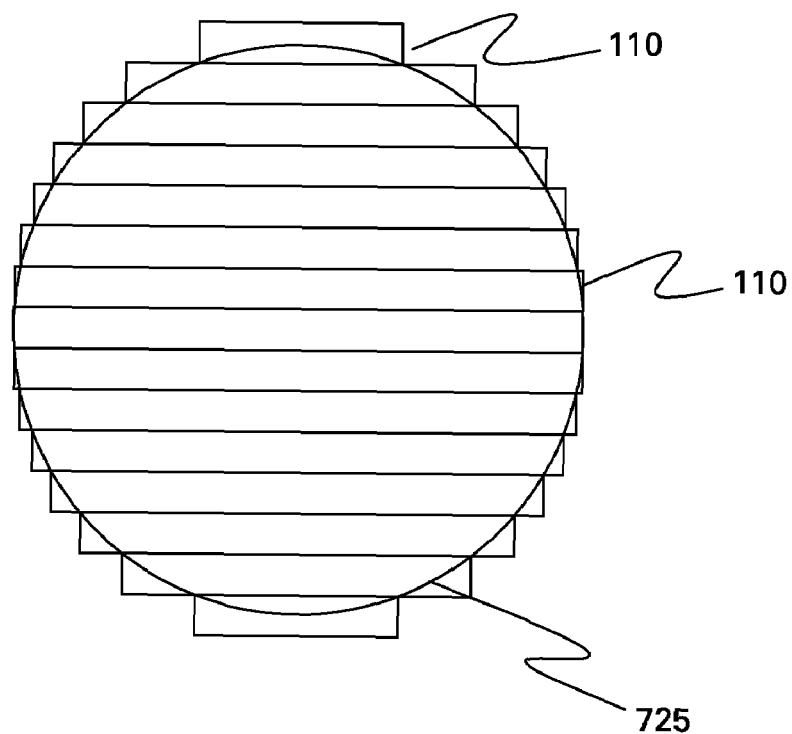
FIG. 19 is another schematic view illustrating an array of multilayer optics positioned in optical communication with the target focal spot of FIG. 17 in accordance with an embodiment of the invention.

With specific reference to FIG. 19, there is shown an array of multilayer optics 110 (FIG. 6). Each of the multilayer optics 110 is fabricated such that its width is sufficient to optically cover the extent of the target spot 725 with enough extra coverage to compensate for any likely movement of the target spot. Each of the multilayer optics 110 can be fabricated to a certain width and stacked as shown in FIG. 19, or they can all be fabricated to the same width and stacked. The multilayer optics 110 may be mounted on one of the windows of the vacuum housing (not shown), either within the housing or on the exterior surface of the window outside of the housing. Alternatively, the multilayer optics 110 may be mounted on or near the target 724 in locations where the target spots 725 are found.

Figure 20:
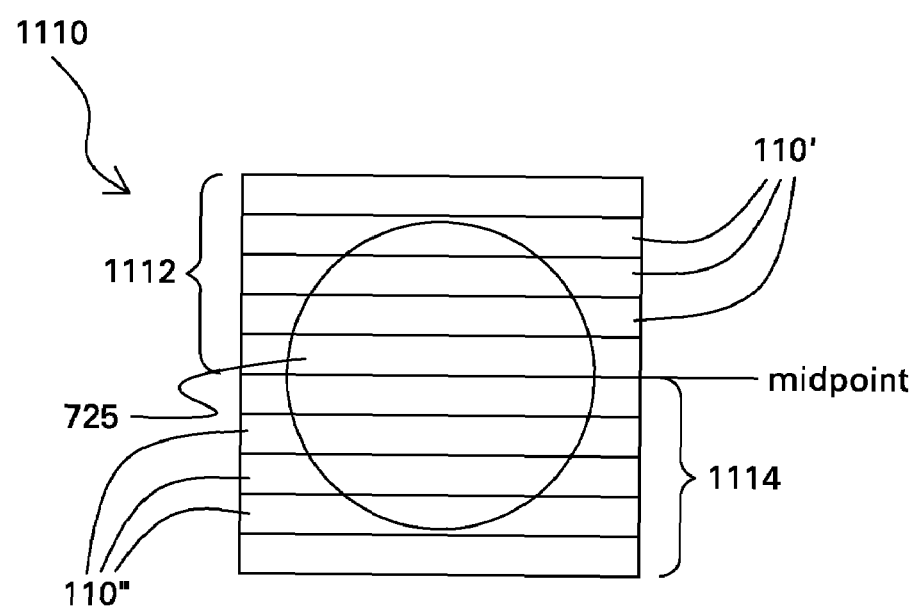
FIG. 20 is another schematic view illustrating an array of multilayer optics positioned in optical communication with the target focal spot of FIG. 17 in accordance with an embodiment of the invention.

With specific reference to FIG. 20, there is shown a single multilayer optic system 1110 formed of numerous multilayer optics stacks 110' and 110" separated at a midpoint. Each multilayer optic 110' is formed from the middle layer 113$mid$ to the exterior layer 113$a$ of the multilayer optics 110 (FIG. 6). Each multilayer optic 110" is formed from the middle layer 113$mid$ to the exterior layer 113$n$ of the multilayer optics 110 (FIG. 6). The multilayer optics 110', 110" are stacked one upon the other to form the multilayer optics stacks of FIG. 20. By externally applying pressure, each of the stacked multilayer optics 110', 110" conforms to the multilayer optic 110', 110" directly beneath it. To ensure that the optics conform to each other, the ability to slip against one another without sticking is necessary. A layer of a material that allows slipping without sticking, for example, polytetrafluoroethylene such as TEFLON®, may be placed in between each of the multilayer optics 110', 110".

Through this process, a first stack 1112 including the optics 110' and a second stack 1114 including the optics 110" can be formed. Then, the stacks 1112 and 1114 can be joined at the midpoint by the lowest layer 113$mid$ of stack 1112 join the highest layer 113$mid$ of stack 1114. In other words, the stacks 1112 and 1114 are joined as mirror images of each other at the midpoint. Again, as with the other arrays of multilayer optics, the multilayer optic system 1110 may be mounted on one of the windows of the vacuum housing (not shown), either within the housing or on the exterior surface of the window outside of the housing. Alternatively, the multilayer optic system 1110 may be mounted on or near the target 724 in locations where the target spots 725 are found. It should be appreciated that each of the multilayer optics 110', 110" can be formed simultaneously within the same sputtering apparatus, thereby minimizing the time required to form stacks 1112, 1114.

Alternatively, instead of fabricating stacks 1112 and 1114 comprising multiple multilayer optics stacks 110', 110", the multilayer optic system 1110 can be formed of a single multilayer optic 110 or a pair of partial multilayer optics 110', 110" (from layer 113$mid$ to layer 113$a$ or 113$n$) joined at the midpoint.

As noted above, the layers of the multilayer optics 110 (FIG. 6) may be tapered at the input face 112 to capture and redirect source X-rays into parallel or quasi-parallel beams in a direction perpendicular to the layers of the optics 110 and a standard or reduced fan beam in a direction parallel to the plane of the layers. A single multilayer optic 110 can be used to redirect intrinsic cone-beam emissions into a near-parallel stack of fan-shaped X-ray beams needed for computed tomography imaging applications. Similarly, the optic arrays described herein can be used to redirect intrinsic cone-beam emissions into the same near-parallel fan shape, with the added advantages of reducing sensitivity to source focal spot movement, more cost-effective manufacturing, reduced reconstruction algorithm complexity, and improved image quality. There are applications that may require CT scanners to include targets with multiple focal spots thereon, or multispot targets, for which the optic arrays can be coupled, either one optic to each source focal spot or an array of optics to each source focal spot.

A third-generation CT imaging system where the X-ray tube and detector rotate about the imaging volume has been described herein; however, the optic is equally applicable to alternate configurations of third-generation technology, for example, with industrial CT configurations where the X-ray source and detector are held fixed and a stage rotates the object during data acquisition.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the embodiments of the invention described with specific reference to FIGS. 19-20 refer to an array of multilayer optic 110 arranged in a single column, it should be appreciated that more than one column of multilayer optics 110 may be utilized as appropriate. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An X-ray imaging system, comprising:
    a target for emitting X-rays upon being struck by electrons from a source of electrons, said target comprising at least one target focal spot; and
    one or more multilayer optic devices for transmitting X-rays through total internal reflection, at least one of said one or more multilayer optic devices being in optical communication with said at least one target focal spot.

2. The X-ray imaging system of claim 1, wherein said one or more multilayer optic devices are arranged to compensate for any movement of said at least one target focal spot on said target.

3. The X-ray imaging system of claim 1, wherein said target is enclosed within a housing having a window, said array of multilayer optic devices being mounted on said window.

4. The X-ray imaging system of claim 3, wherein said one or more multilayer optic devices is mounted within the housing.

5. The X-ray imaging system of claim 3, wherein said one or more multilayer optic devices is mounted on an exterior surface of said window.

6. The X-ray imaging system of claim 1, wherein said one or more multilayer optic devices is mounted on or near said target for transmission targets or near said target for reflection targets.

7. The X-ray imaging system of claim 1, wherein each one or more multilayer optic devices has a circular cross-sectional profile.

8. The X-ray imaging system of claim 1, wherein said one or more multilayer optic devices comprises a plurality of multilayer optic devices arranged in a column and having a rectangular cross-sectional profile.

9. The X-ray imaging system of claim 1, wherein said one or more multilayer optic devices comprises a plurality of multilayer optic devices stacked upon each other, wherein each multilayer optic device has an exterior surface sloping between an input and an output face.

10. The X-ray imaging system of claim 9, wherein said one or more multilayer optic devices comprises a pair of stacks of multilayer optic devices, each stack positioned to be a mirror image of the other stack.

11. The X-ray imaging system of claim 9, comprising a material positioned between each multilayer optic device to allow atomic-level conformity of adjacent multilayer optic devices.

12. The X-ray imaging system of claim 11, wherein said material comprises polytetrafluoroethylene.

13. The X-ray imaging system of claim 1, comprising one of a radiographic, computed tomography, or therapeutic imaging system.

14. A method for imaging an object with an X-ray imaging machine, comprising:
    emitting electron beams from at least one electron beam emitter toward a target having at least one target focal spot;
    emitting X-rays from the at least one target focal spot toward the object in response to being struck by the electron beams;
    transmitting through total internal reflection the emitted X-rays via one or more multilayer optic devices positioned such that at least one of the one or more multilayer optic devices is in optical communication with the at least one target focal spot; and
    using the emitted X-rays transmitted via the one or more multilayer optic devices to generate an image of the object.

15. The method of claim 14, wherein said transmitting through total internal reflection the emitted X-rays via one or more multilayer optic devices is accomplished with an array of multilayer optic devices each having a circular cross-sectional profile.

16. The method of claim 14, wherein said one or more multilayer optic devices is sufficiently large to compensate for any movement of the at least one target focal spot on the target.

17. The method of claim 14, wherein said transmitting through total internal reflection the emitted X-rays via one or more of multilayer optic devices is accomplished with an array of multilayer optic devices arranged in a column and each having a rectangular cross-sectional profile.

18. A method for forming a stack of multilayer optic devices, comprising:
    a. forming a first solid phase layer, characterized by a first index of refraction, onto a planar blank and forming on the first solid phase layer a second solid phase layer, characterized by a second index of refraction to form a multilayer optic device;
    b. repeating step (a) multiple times; and
    c. stacking each multilayer optic device upon another multilayer optic device.

19. The method of claim 18, comprising positioning a material between each multilayer optic device, said material to allow atomic-level conformity between adjacent multilayer optic devices.

20. The method of claim 18, wherein step (b) is accomplished by performing step (a) multiple times simultaneously.

21. The method of claim 18, wherein step (c) is accomplished by forming a pair of stacks of multilayer optic devices and positioning them so that each stack is a mirror image of the other stack.

* * * * *